(12) United States Patent
Park et al.

(10) Patent No.: US 9,856,815 B2
(45) Date of Patent: Jan. 2, 2018

(54) ENGINE CONTROL DEVICE AND METHOD OF HYBRID VEHICLE

(71) Applicants: Hyundai Motor Company, Seoul (KR); Kia Motors Corporation, Seoul (KR)

(72) Inventors: Il Kwon Park, Seoul (KR); In Eok Cho, Incheon (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 135 days.

(21) Appl. No.: 14/945,092

(22) Filed: Nov. 18, 2015

(65) Prior Publication Data

US 2017/0058812 A1    Mar. 2, 2017

(30) Foreign Application Priority Data

Sep. 2, 2015 (KR) .................. 10-2015-0124460

(51) Int. Cl.
| | | |
|---|---|---|
| *F02D 41/14* | (2006.01) | |
| *B60W 10/06* | (2006.01) | |
| *F02D 41/24* | (2006.01) | |
| *B60W 20/10* | (2016.01) | |
| *F02D 41/08* | (2006.01) | |

(52) U.S. Cl.
CPC ......... *F02D 41/2438* (2013.01); *B60W 10/06* (2013.01); *B60W 20/10* (2013.01); *F02D 41/1406* (2013.01); *F02D 41/2451* (2013.01); *F02D 41/08* (2013.01); *F02D 2200/1002* (2013.01); *F02D 2200/1006* (2013.01); *Y02T 10/6286* (2013.01)

(58) Field of Classification Search
CPC ............ F02D 41/1406; F02D 41/2438; F02D 41/2451; F02D 2200/1002; F02D 2200/1006; B60W 10/06; B60W 20/10; Y02T 10/6286
USPC ....................................... 701/102; 180/65.28
See application file for complete search history.

(56) References Cited

U.S. PATENT DOCUMENTS

| | | | | |
|---|---|---|---|---|
| 8,406,954 B2* | 3/2013 | Whitney | .............. | B60H 1/3205 123/339.17 |
| 2001/0002090 A1* | 5/2001 | Frohlich | ................ | B60K 6/485 290/40 R |
| 2002/0132701 A1* | 9/2002 | Mabuchi | ............... | F02D 31/003 477/110 |
| 2007/0255488 A1* | 11/2007 | Okubo | ................... | B60K 6/365 701/110 |

(Continued)

FOREIGN PATENT DOCUMENTS

| | | |
|---|---|---|
| JP | 10-325349 A | 12/1998 |
| JP | 2013-082288 A | 5/2013 |

(Continued)

*Primary Examiner* — Erick Solis
(74) *Attorney, Agent, or Firm* — Brinks Gilson & Lione

(57) ABSTRACT

An engine control method of a hybrid vehicle for controlling the engine depending on an engine load of the hybrid vehicle includes: learning a change amount of an engine load; determining at least one engine torque depending on a magnitude of the engine load; calculating an optimum torque value by using the learned change amount of the engine load and at least one determined engine torque; and controlling the engine by using the calculated optimum torque value.

5 Claims, 6 Drawing Sheets

(56) References Cited

U.S. PATENT DOCUMENTS

2009/0012665 A1* 1/2009 Brennan ................. B60L 1/003
                                                    701/22
2012/0179312 A1* 7/2012 Schwenke ........... F02N 11/0862
                                                    701/22

FOREIGN PATENT DOCUMENTS

KR          10-1210784 B1    12/2012
KR          10-1526813 B1     6/2015

* cited by examiner

FIG. 5 "Prior Art"

ENGINE CONTROL DEVICE AND METHOD OF HYBRID VEHICLE

CROSS-REFERENCE TO RELATED APPLICATION

This application claims the benefit of Korean Patent Application No. 10-2015-0124460, filed on Sep. 2, 2015, which is incorporated herein by reference in its entirety.

FIELD

The present disclosure relates to an engine control device of a hybrid vehicle, and engine control thereof.

BACKGROUND

The statements in this section merely provide background information related to the present disclosure and may not constitute prior art.

A hybrid vehicle uses a combination of power of an internal combustion engine and power of a motor with efficiency.

In general, the hybrid electric vehicle includes an engine, a motor, an engine clutch controlling torque between the engine and the motor, a transmission, a differential gear device, a battery, an integrated starter & generator (ISG) starting the engine or generating power according to output of the engine, and wheels. The integrated starter-generator may be referred to as a hybrid starter & generator (HSG).

The hybrid vehicle executes torque distribution control of the engine and the motor for enhancement of fuel consumption in the driving of a hybrid electric vehicle mode (HEV mode), and selects an optimization torque of the engine for best system efficiency by considering engine efficiency and motor and battery efficiency. Accordingly, since the load of the engine is different depending on each vehicle or a state of taming the engine, the engine efficiency is changed. Accordingly, the optimized engine torque value must be changed depending on the engine efficiency that is changed thus to maximize the fuel consumption of the HEV vehicle However, we have discovered that the engine torque is only determined by the torque map of the engine of which the taming is off such that the engine load is low only, and in the vehicle of which the engine taming is not off such that the engine load is high, the optimized engine torque is matched such that the vehicle fuel consumption may be decreased.

SUMMARY

The present disclosure provides an engine control device of a hybrid vehicle controlling an engine by an optimum torque by learning a deviation of an engine load, and an engine control method thereof.

A method for controlling an engine depending on an engine load of a hybrid vehicle according to the present disclosure includes: learning a change amount of an engine load; determining at least one engine torque depending on a magnitude of the engine load; calculating an optimum torque value by using the learned change amount of the engine load and at least one determined engine torque; and controlling the engine by using the calculated optimum torque value.

The learning of the change amount of the engine load may include learning a deviation of the friction torque in an idle state.

The determining of the engine torque may include: determining a first engine torque when the engine load is a minimum; and determining a second engine torque when the engine load is a maximum.

The calculating of the optimum torque value may include calculating the optimum torque value by using the deviation of the friction torque, a predetermined maximum value of the friction torque deviation, the first engine torque, and the second engine torque.

The control of the engine may include measuring the engine load and summing the measured engine load and the calculated optimum torque value while the hybrid vehicle is driven to calculate the output torque of the engine and to control the engine by the calculated output torque.

An engine control device of a hybrid vehicle according to the present disclosure includes: a learning unit learning a change amount of an engine load; a torque determining unit determining at least one engine torque depending on a magnitude of the engine load; and a control unit calculating an optimum torque value by using the learned change amount of the engine load and at least one determined engine torque and controlling an output torque of the engine by using the measured engine load and the optimum torque value while the hybrid vehicle is driven.

The control unit may include: an optimum torque calculation unit calculating the optimum torque value of the engine by using the learned change amount of the engine load and at least one determined engine torque; and an output torque calculation unit calculating the output torque of the engine by summing the measured engine load and the calculated optimum torque value.

The learning unit may learn a deviation of the friction torque in an idle state.

The determining unit may include: a first torque determining unit determining a first engine torque when the engine load is a minimum; and a second torque determining unit determining a second engine torque when the engine load is a maximum.

The optimum torque calculation unit may calculate the optimum torque value by using the deviation of the friction torque, a predetermined maximum value of the friction torque deviation, the first engine torque, and the second engine torque.

According to the present disclosure, by learning the deviation of the engine load and variably controlling the engine by using the engine torque in the minimum engine load and the engine torque in the maximum engine load, even if the deviation between the engine and the engine taming deviation are generated, the engine may be effectively controlled, thereby providing an environment improving the fuel consumption.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
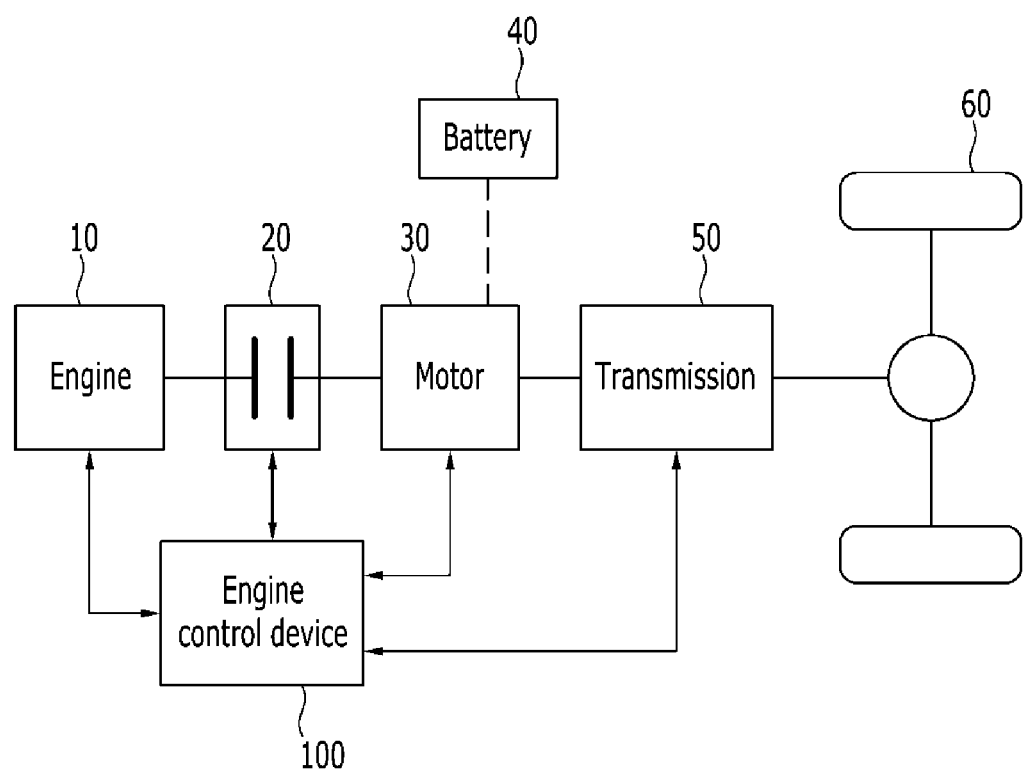
FIG. 1 is a schematic view showing a configuration of a control system of a hybrid vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described embodiments may be modified in various different ways, all without departing from the spirit or scope of the present disclosure.

In addition, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuel derived from resources other than petroleum).

Now, an engine control device of a hybrid vehicle and an engine control method thereof according to an form embodiment of the present disclosure will be described with reference to FIG. 1 to FIG. 6.

FIG. 1 is a schematic view showing a configuration of a control system of a hybrid vehicle according to one form of the present disclosure.

The hybrid vehicle will be described below in terms of an example of a structure using a manner of a transmission mounted electric device (TMED). However, the scope of the present disclosure may not be limited thereto, and may also be applied to other types of hybrid electric vehicles.

As shown in FIG. 1, a control system of a hybrid vehicle according to one form of the present disclosure includes an engine 10, a motor 30, an engine clutch 20 controlling power between the engine 10 and the motor 30, a battery 40, a transmission 50, a wheel 60, and an engine control device 100.

The engine 10 combusts fuel to generate power. The motor 30 supports power of the engine 10 and functions as a generator during braking to generate electrical energy.

The motor 30 is operated by using electrical energy charged to the battery 40. The battery 40 may store a high voltage, and supplies a driving voltage to the driving motor 20 in an EV mode and an HEV mode and may be charged with electricity recovered through the driving motor 30 in a regenerative braking mode.

In the power delivery of the hybrid vehicle, the torque generated in the engine 10 or the motor 30 is selectively transmitted to the input shaft of the transmission 50, and the torque output from the output shaft of the transmission 50 is transmitted to an axle via a differential gear device. The axle rotates the wheel 60 so that the hybrid electric vehicle runs by the torque generated from the engine 10 and/or the motor 30.

The engine control device 100 controls elements of the vehicle including the engine 10, the engine clutch 20, the motor 30, and the transmission 50.

The engine control device 100 controls output torque of the engine 10 and the motor 30 depending on a state of the hybrid electric vehicle, and drives the hybrid electric vehicle in the EV mode, the HEV mode, and the regenerative braking mode depending on a driving condition and a state of charge (SOC) of the battery 40.

For this, the engine control device 100 may be configured as at least one processor that is operated according to a predetermined program that is configured to perform each step of the control method of a hybrid vehicle according to one form of the present disclosure.

Figure 2:
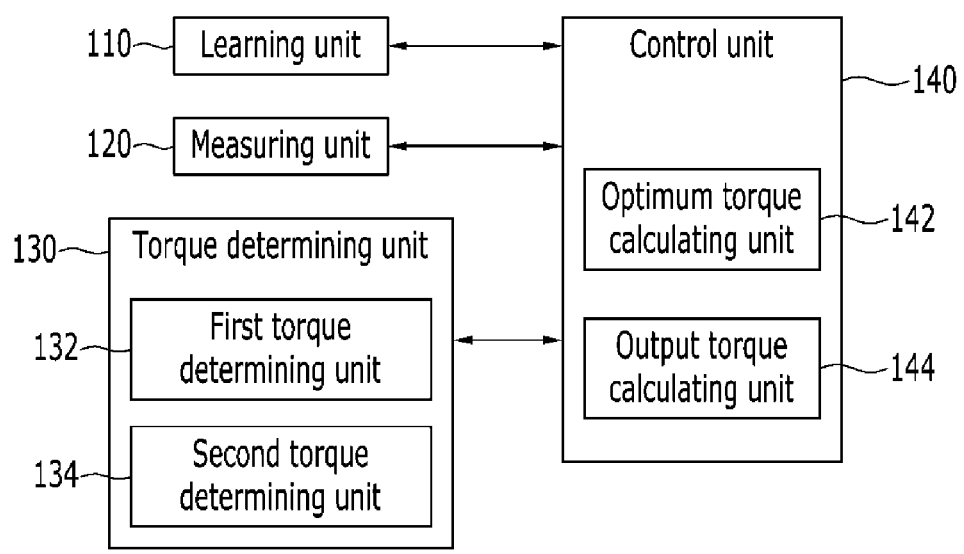
FIG. 2 is a view schematically showing a structure of an engine control device according to the present disclosure.

FIG. 2 is a view schematically showing a structure of an engine control device according to one form of the present disclosure. In this case, the engine control device of the hybrid vehicle is described only as a schematic configuration and is not limited to such a configuration.

Referring to FIG. 2, the engine control device 100 of the hybrid vehicle includes a learning unit 110, a measuring unit 120, a torque determining unit 130, and a control unit 140.

The learning unit 110 learns the change amount of the engine load of the hybrid vehicle, and transmits the learned change amount of the engine load to the control unit 140. Here, the change amount of the engine load includes a deviation of friction torque. Also, the learning unit 110 may learn the deviation of the friction torque in an idle state.

The measuring unit 120 measures the engine load during the driving of the hybrid vehicle, and transmits the measured engine load to the control unit 140.

The torque determining unit 130 determines the engine torque depending on the magnitude of the engine load by using at least one torque map. The torque determining unit 130 may determine an optimal engine torque when the engine load is a minimum, and may determine the optimal engine torque when the engine load is a maximum.

Also, the torque determining unit 130 may include a first torque determining unit 132 and a second torque determining unit 134.

The first torque determining unit 132 determines a first engine torque when the engine load is a minimum by a first torque map. The second torque determining unit 134 determines a second engine torque when the engine load is a maximum by a second torque map.

The control unit 140 calculates an optimum torque value of the engine by using the change amount of the engine load, the first engine torque when the engine load is a minimum, and the second engine torque when the engine load is a maximum.

The control unit 140 may calculate the output torque of the engine by using the optimum torque value and may control the engine 10 by the calculated output torque.

The control unit 140 may include an optimum torque calculation unit 142 and an output torque calculation unit 144.

The optimum torque calculation unit 142 calculates the optimum torque value of the engine by using the change amount of the engine load, the first engine torque when the engine load is a minimum, and the second engine torque when the engine load is a maximum.

The optimum torque calculation unit 142 may calculate the optimum torque value by using the deviation of the learned friction torque in the learning unit 110, a maximum value of a predetermined friction torque deviation, the first engine torque, and the second engine torque.

The output torque calculation unit 144 may sum the measured engine load and the calculated optimum torque value to calculate the output torque of the engine.

To this end, the control unit 140 may be implemented by at least one processor which operates by a predetermined program, and the predetermined program may be programmed to perform individual steps of an engine control method of a differential amplifier.

Figure 3:
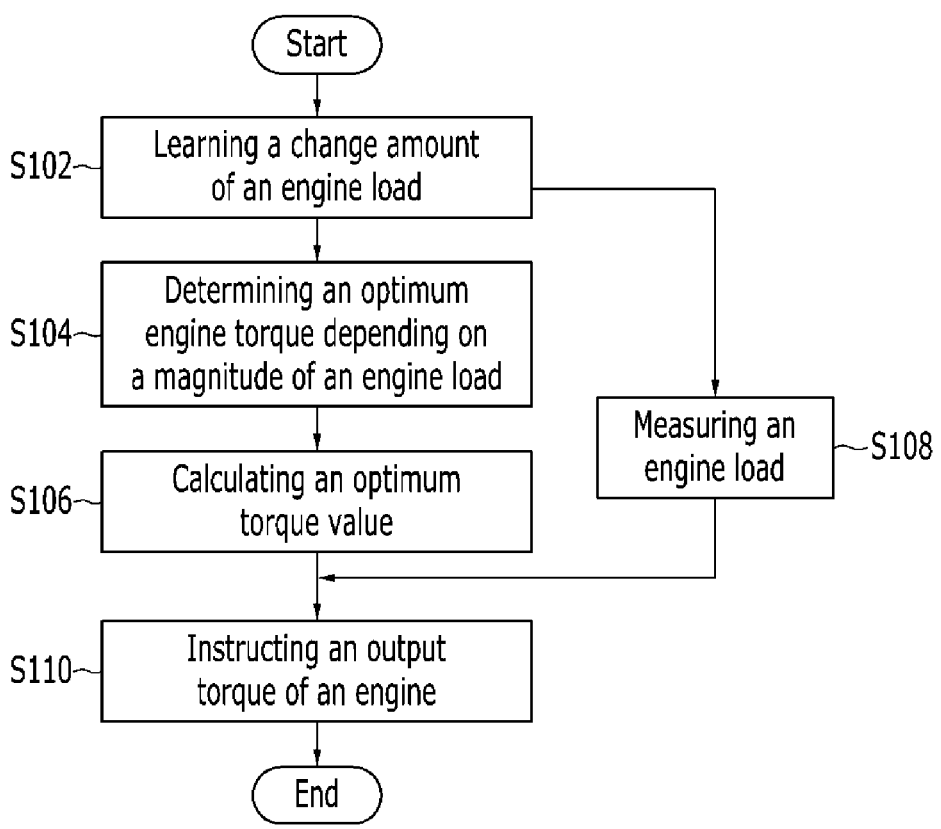
FIG. 3 is a flowchart schematically showing a process of controlling an engine by learning an engine load through an engine control device according to the present disclosure.

FIG. 3 is a flowchart schematically showing a process of controlling an engine by learning an engine load through an engine control device according to one form of the present disclosure. The following flowchart will be described with the same reference numerals as those of a configuration of FIG. 1 and FIG. 2.

Referring to FIG. 3, the engine control device 100 learns the change amount of the engine load in the idle state (S102). Here, the change amount of the engine load includes the deviation of the friction torque.

Also, the engine control device 100 determines the engine torque depending on the engine load magnitude (S104). The engine control device 100 may respectively determine the engine torque when the engine load is a minimum and the engine torque when the engine load is a maximum.

The engine control device 100 calculates the optimum torque value of the engine by using the change amount of the engine load, the engine torque when the engine load is a minimum, and the engine torque when the engine load is a maximum (S106).

The engine control device 100 measures the engine load while the hybrid vehicle is driven (S108).

Also, the engine control device 100 sums the measured engine load and the optimum torque value to calculate the output torque of the engine and controls the engine by the output torque (S110).

Figure 4:
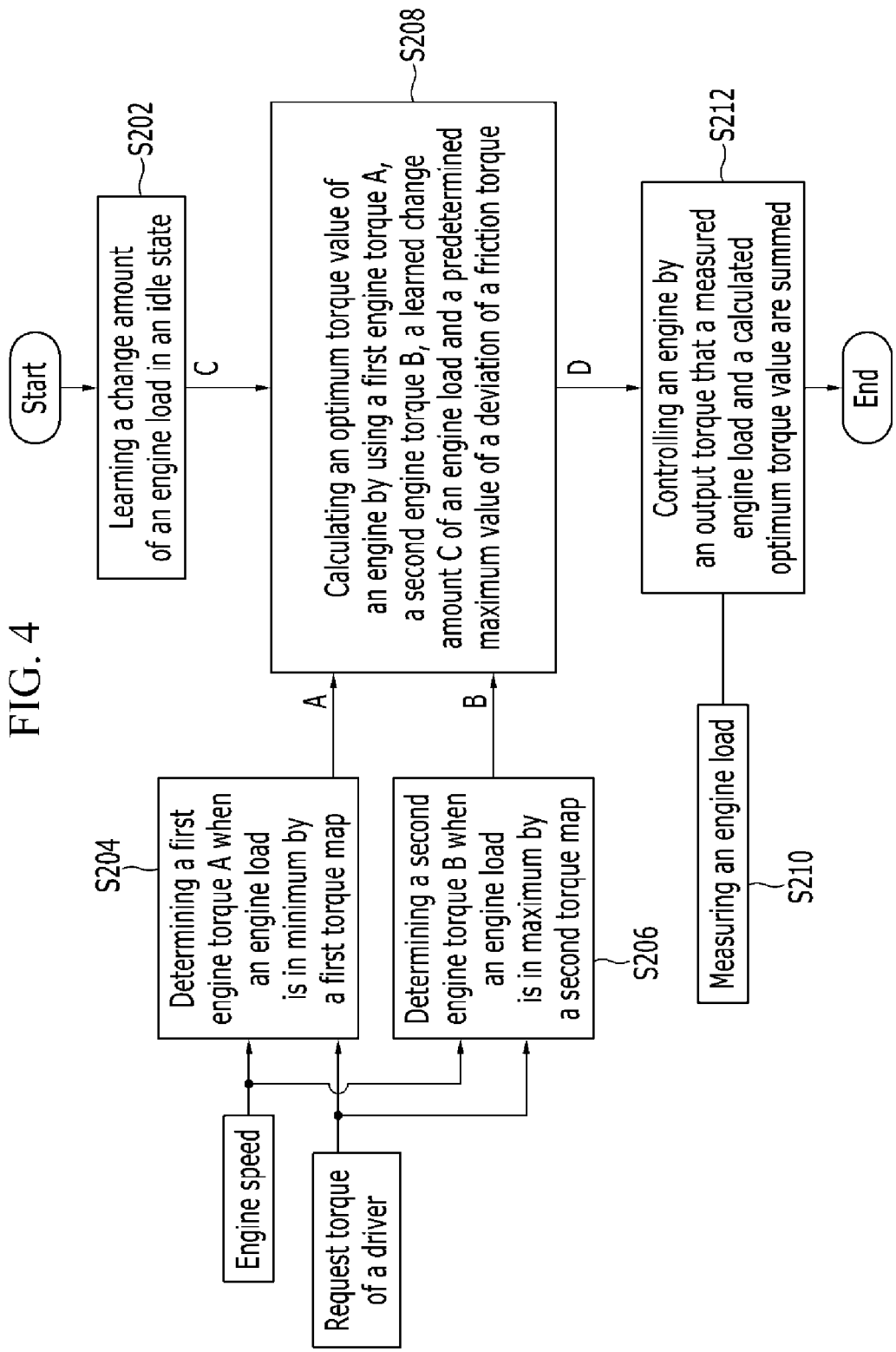
FIG. 4 is a flowchart schematically showing a process of controlling an engine by using an engine torque depending on an engine load and a load magnitude that are learned.

FIG. 4 is a flowchart schematically showing a process of controlling an engine by using an engine torque depending on an engine load and a load magnitude that are learned according to one form of the present disclosure. The following flowchart will be described by using the same reference numerals in connection with the configuration of FIG. 1 and FIG. 2.

Referring to FIG. 4, the engine control device 100 learns the change amount C of the engine in the load idle state (S202). Here, the change amount of the engine load includes the deviation of the friction torque, and the engine control device 100 may learn the deviation of the friction torque in the idle state.

Also, the engine control device 100 respectively determines the engine speed and the engine torque depending on the engine load magnitude according to the request torque of the driver. The engine control device 100 respectively determines the first engine torque A at the minimum engine load by the first torque map and the second engine torque B at the maximum engine load by the second torque map (S204) and (S206).

Also, the engine control device 100 calculates an optimum torque value D of the engine by using Equation 1 (S208).

$$D = A\left(1 - \frac{C}{M}\right) + B\frac{C}{M} \qquad \text{(Equation 1)}$$

Here, A is the engine torque at the minimum engine load, B is the engine torque at the maximum engine load, C is the change amount or the deviation of the learned friction torque of the engine load, and M represents a predetermined maximum value of the friction torque deviation.

Also, the engine control device 100 measures the engine load when the hybrid vehicle is driven, and controls the engine through the output torque of which the measured engine load and the optimum torque value are summed (S210) and (S212).

Figure 5:
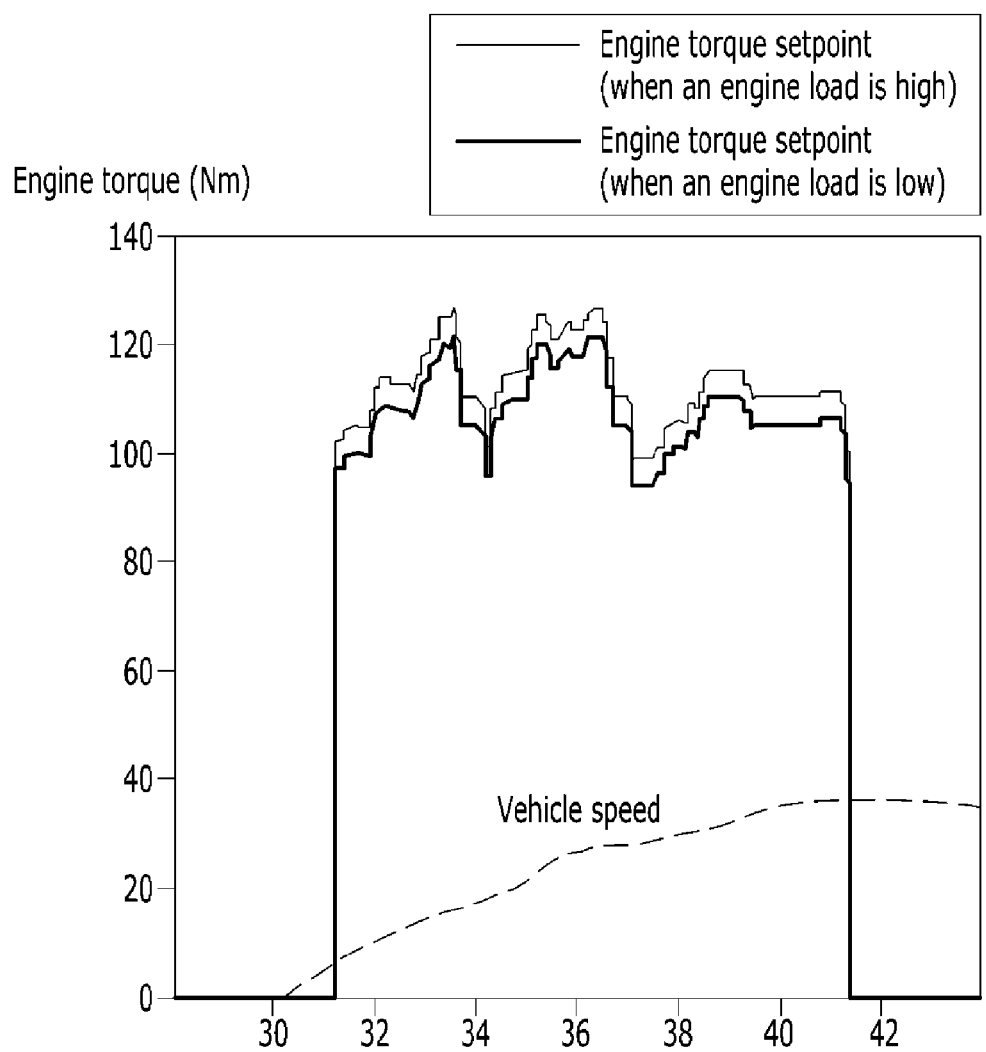
FIG. 5 is a view showing an example of controlling output of an engine according to a conventional art.
Figure 6:
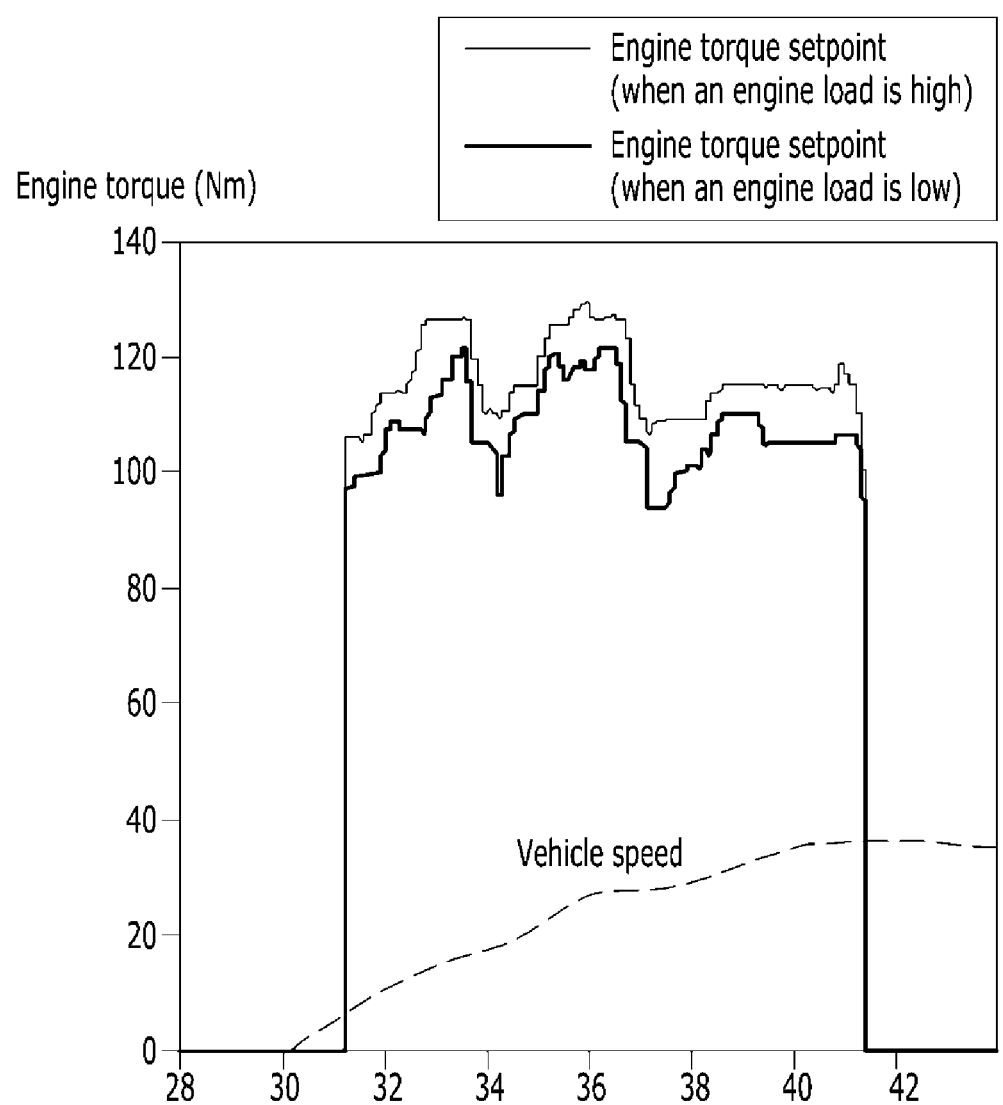
FIG. 6 is a view showing an example of variably controlling an engine by an optimum torque according to the present disclosure.

FIG. 5 is a view showing an example of controlling output of an engine according to a conventional art, and FIG. 6 is a view showing an example of variably controlling an engine by an optimum torque according to the present disclosure.

As shown in FIG. 5, in the conventional art, while the engine load is increased, the torque is increased as a simple offset concept. However, in the engine control device according to the present disclosure, while the engine load is increased, as shown in FIG. 6, the engine is variably controlled by the separately predetermined optimal engine torque depending on the learning value of the engine load.

Accordingly, in the engine control device according to one form of the present disclosure, by controlling the engine so as to output the optimal engine torque depending on the engine load, even if the engine load deviation is generated, the control may be realized so as to maximize the system efficiency, and the fuel consumption of the hybrid vehicle may be improvised.

As described above, the engine control device of the hybrid vehicle according to the present disclosure learns the deviation of the engine load and variably controls the engine by using the engine torque at the minimum engine load and the engine torque at the maximum engine load, and although the deviation between the engine and the engine taming is generated, the engine may be effectively controlled, thereby providing an environment improving the fuel consumption.

The above-described embodiments can be realized through a program for realizing functions corresponding to the configuration of the embodiments or a recording medium for recording the program in addition to through the above-described device and/or method, which is easily realized by a person skilled in the art. This recording medium may be executed in a user terminal as well as servers.

While this present disclosure has been described in connection with what is presently considered to be practical form embodiments, it is to be understood that the present disclosure is not limited to the disclosed embodiments, but, on the contrary, is intended to cover various modifications and equivalent arrangements included within the spirit and scope of the appended claims.

What is claimed is:

1. A method for controlling an engine depending on an engine load of a hybrid vehicle, comprising:
   learning a change amount of an engine load by a learning unit;

determining by a torque determining unit at least one engine torque depending on a magnitude of the engine load;

calculating by a control unit an optimum torque value by using the learned change amount of the engine load and at least one determined engine torque; and controlling the engine by using the calculated optimum torque value, wherein the learning of the change amount of the engine load includes learning a deviation of a friction torque in an idle state, and wherein the determining of the at least one engine torque comprises:

determining a first engine torque when the engine load is a minimum; and determining a second engine torque when the engine load is a maximum.

2. The method of claim 1, wherein the calculating of the optimum torque value includes calculating the optimum torque value by using the deviation of the friction torque, a predetermined maximum value of the friction torque deviation, the first engine torque, and the second engine torque.

3. The method of claim 2, wherein the controlling the engine comprises:

measuring the engine load; and summing the measured engine load and the calculated optimum torque value while the hybrid vehicle is driven to calculate an output torque of the engine and to control the engine by the calculated output torque.

4. An engine control device of a hybrid vehicle, comprising:

a learning unit configured to learn a change amount of an engine load;

a torque determining unit configured to determine at least one engine torque depending on a magnitude of the engine load; and a control unit configured to calculate an optimum torque value by using the learned change amount of the engine load and the at least one determined engine torque and control an output torque of the engine by using the magnitude of the engine load and the optimum torque value while the hybrid vehicle is driven, wherein the control unit comprises:

an optimum torque calculation unit configured to calculate the optimum torque value of the engine by using the learned change amount of the engine load and the at least one determined engine torque; and an output torque calculation unit configured to calculate the output torque of the engine by summing the engine load and the calculated optimum torque value, wherein the learning unit is configured to learn a deviation of a friction torque in an idle state, and wherein the torque determining unit comprises:

a first torque determining unit configured to determine a first engine torque when the engine load is a minimum; and a second torque determining unit configured to determine a second engine torque when the engine load is a maximum.

5. The engine control device of claim 4, wherein the optimum torque calculation unit is configured to calculate the optimum torque value by using the deviation of the friction torque, a predetermined maximum value of the friction torque deviation, the first engine torque, and the second engine torque.

\* \* \* \* \*